Figure 1:
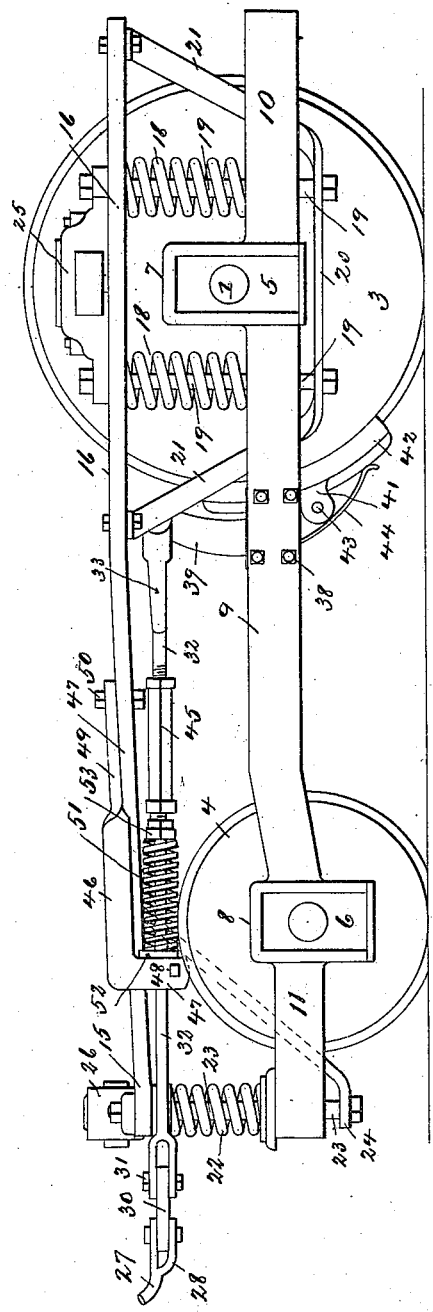

(No Model.) 3 Sheets—Sheet 1.

J. A. BRILL.
CAR BRAKE.

No. 503,121. Patented Aug. 15, 1893.

Attest:
C. W. Benjamin
H. F. Dunbar

Inventor,
John A. Brill.
by Joseph L. Levy
atty.

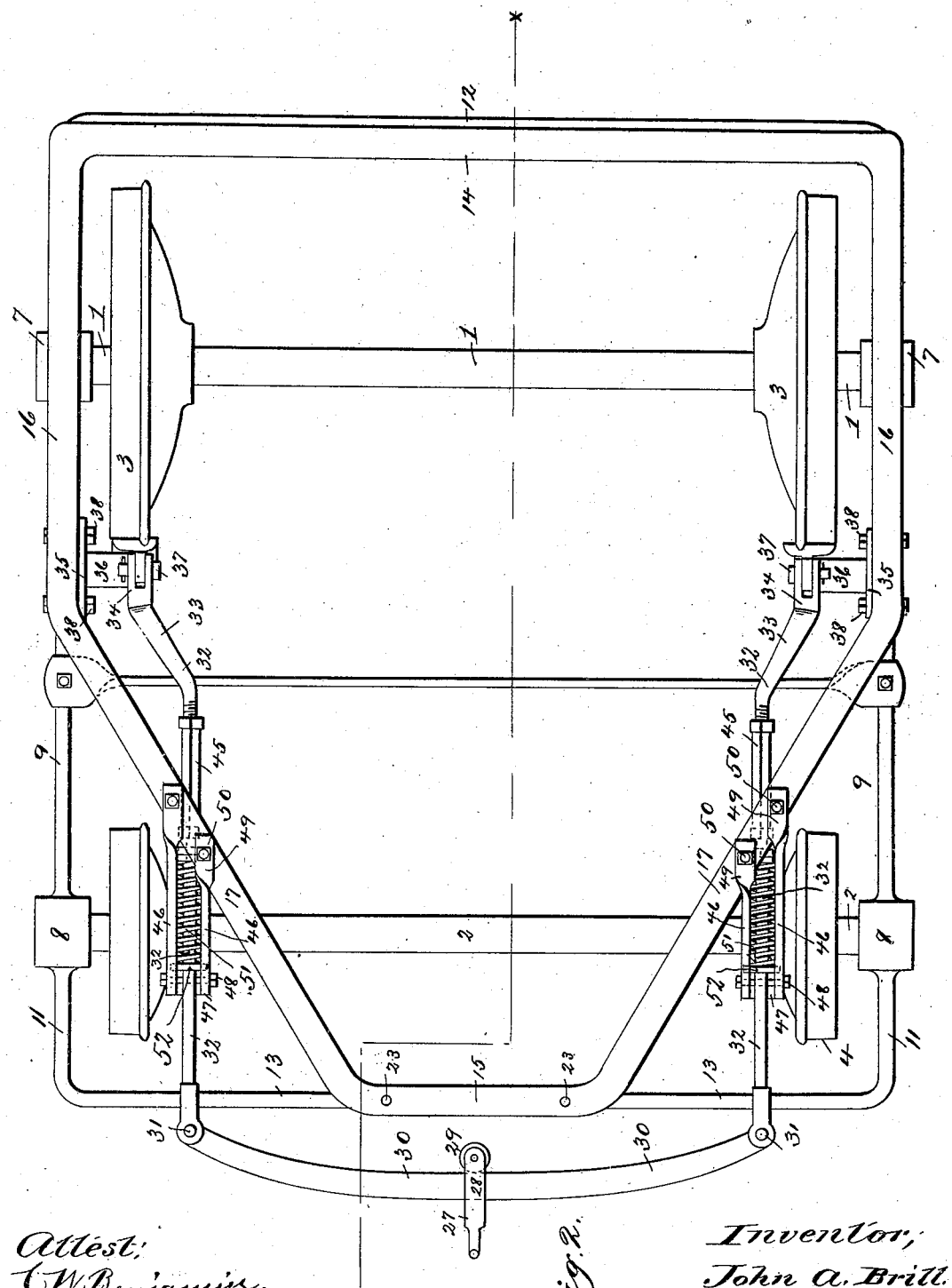

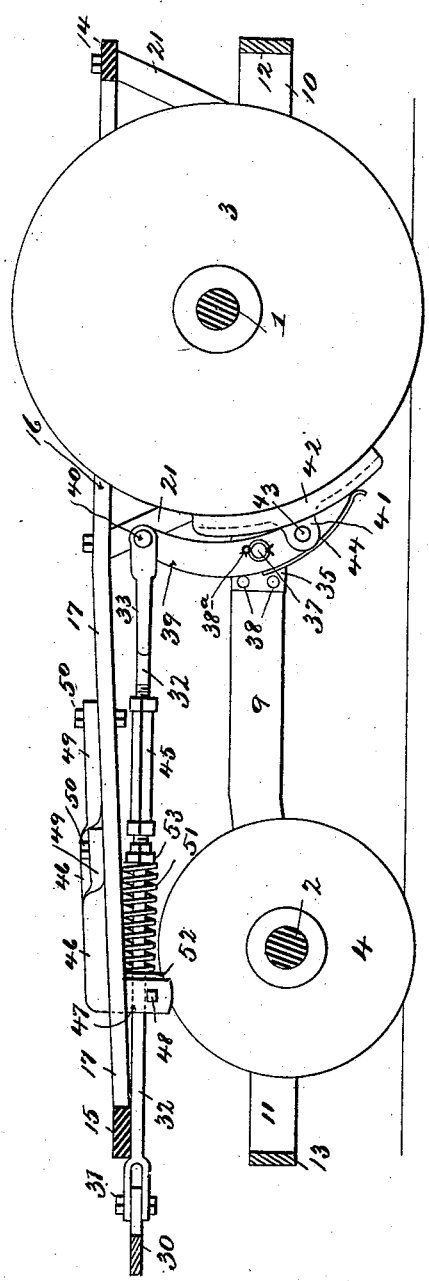

UNITED STATES PATENT OFFICE.

JOHN A. BRILL, OF PHILADELPHIA, PENNSYLVANIA.

CAR-BRAKE.

SPECIFICATION forming part of Letters Patent No. 503,121, dated August 15, 1893.

Original application filed October 22, 1892, Serial No. 449,607. Divided and this application filed April 6, 1893. Serial No. 469,253. (No model.)

*To all whom it may concern:*

Be it known that I, JOHN A. BRILL, a citizen of the United States, residing at Philadelphia, in the county of Philadelphia and State of Pennsylvania, have made certain new and useful Improvements in Brake Mechanisms, of which the following is a specification.

My invention has special reference to brake mechanism for car trucks, and the object of my improvements is to provide a brake mechanism simple in construction and operation which is specially adapted for use on pivotal trucks and which is so disposed as to leave the center of the truck free from obstruction by the rods and levers of the brake mechanism, and also one in which the pull of the brake operating rod, or line of draft, as it is called, can be equalized, so as to pull equally on all the truck brake rods.

My invention also comprises means for accomplishing the equalization of the draft without interfering with the movement of the car body on the truck springs, and in the disposition of a portion of the brake mechanism in relation to the peculiarly constructed portion of the truck.

My invention further comprises the details of structure hereinafter described and further pointed out in the claims.

In the drawings accompanying this specification—Figure 1 is a side elevation of a truck showing my brake mechanism applied thereto; Fig. 2, a plan view thereof, the side and end bearings being removed; Fig. 3, a sectional elevation on the line *x x*, Fig. 2, the side and end bearings and end springs being omitted.

Like numerals of reference refer to like parts throughout the several views.

The truck shown herein and to which my brake mechanism has particular reference forms the subject matter of an application for Letters Patent filed by me on the 22d day of October, 1892, and numbered serially 449,607, of which this is a divided case, and to which cross reference is made for the structure and peculiarities of the truck.

My brake mechanism, as a whole, is not limited in its use to a truck of this structure, but certain elements of the brake mechanism have been found to be particularly applicable to a truck having the peculiarities of structure and function as set forth in said application, and I shall, therefore, claim certain parts of the brake mechanism in combination with certain elements of the truck peculiar to itself.

In the drawings 1 is the driving axle; 2, the trailing axle; 3, the driving wheels; 4, the trailing wheels, both of the axles being journaled in axle boxes 5, 6, (not shown) upon which rest the yokes 7, 8 of the axle box frame, the yokes being secured to the side bars 9 which have extensions 10, 11 leading out from the yokes, the extensions being united by the cross bars 12, 13 so that the central sections 9, extensions 10, 11 and cross bars form a rectangular frame encompassing the wheels and supported upon the axle boxes in any way known to the art. The upper chord formed of the cross bars 14, 15, side sections 16 and oblique side sections 17, all united into a continuous element, is supported upon the axle box frame adjacent to the driving wheels 3 by the axle box springs 18, through which pass the spring posts 19 which likewise pass through the axle box frame, the spring posts being tied together below by the pedestal tie bar 20 having the angular arms 21 which are secured at their extremities to the upper chord, the upper chord being supported upon the axle box frame at the end of the truck by the springs 22 which rest upon the cross bar 13 and through which extend the spring posts 23 which are tied below by the pedestal tie bar 24, the arms of which extend up to the upper chord and are secured thereto as is the tie bar 20. Over the axle boxes of the large wheels lie the side bearings 25, and on the cross bar 15 of the upper chord and over the springs 22 lies the end bearing 26.

For a more fuller description of the truck reference is had to the application before referred to. It is proposed in that application to utilize the end springs not only for the purpose of assisting the axle box springs in supporting the car body but also for the purpose of preventing or tending to prevent the small or trailing wheels from jumping the track and pounding thereon, the peculiar structure of the truck causing a disposition to do this, the end bearing placing a portion of the weight of the car on the end springs which in turn bear down on the extension of the axle box frame, acting as a lever of the first order to keep the trailing wheels on the track. It will also be noticed that the pivotal point of the truck is over the axle of the driving wheel, which causes the trailing end to have a degree of radiation greater than the driving end of the truck.

From a platform lever or windlass, or other convenient source, leads the brake rod 27 provided with a bifurcated end 28 within which lies a roller 29, Fig. 2. The connecting rod 27 leads either from the car platform where it is operated by a windlass or lever in the usual way, or from some proper part of brake mechanism of a truck located under the same car body, or it can be arranged in any way so as to connect it with the source of power.

Located without the wheel base of the truck and without the end springs 22 is a transversely extending segmental bar 30 having pivotally secured at its ends by means of the pins 31 two longitudinal extending parallel connecting rods 32. It will be noticed that the equalizing bar 30 and the connecting rods 32 are so disposed as to leave the truck between the wheels and axles practically clear from obstruction thereby, the connecting rod 27 being united to the truck brake mechanism in such a way that it can move in relation thereto without impairing the uniformity of application of the brake shoes to the wheel, the union of such rod and the truck brake mechanism being had without or outside of the truck and beyond the end springs 22, so that space for such movement is had where it will not interfere with either the motor or its support within the truck or the end springs. A support (see application before referred to) is formed by the cross bar *a* secured to the sections 9 of the axle box frame.

The inner ends of the connecting rods 32 are bent outwardly, as shown at 33, (see Fig. 2) the extreme ends of which are bifurcated as at 34. In this case the brake shoes are applied to the large wheels only, and to support the shoes in proper relation thereto the journal block 35, which has an inwardly extending boss 36 upon which is formed the journal bearing 37, is secured to the sections 9 of the side bars by means of the bolts 38, the journal blocks being located adjacent to the tread of the wheel.

Upon the spindle 37 and secured thereto by the cotter or split pin 38, or in any other desirable way, is a rocking lever 39, the upper arm of which enters the bifurcation 34 in the ends of the rods 32, and is pivotally secured thereto by the pin 40, the lower arm of said rocking lever being pivotally secured to the lug 41 on the brake shoe 42 by means of the pin 43, the lever 39 thereby supporting the shoe adjacent to the tread of the wheel.

A spring 44 secured at one end to the lever 39 bears against the lower portion of the brake shoe and prevents it falling too far away from the tread of the wheel, and keeps it in position for having its entire face presented to the tread of the wheel simultaneously.

It is desirable that means be provided for lengthening or shortening the connecting rods 32, and for this purpose I have made them in two parts, their adjacent ends being screw threaded and united together by the sleeved nut or turn buckle 45, so that said rods may be lengthened or shortened at will.

For supporting the equalizing bar 30 and the connecting rods 32 I use the hangers 46 which are formed of strap iron bent double to form two parallel bars, and downward, as at 47, and through the sides of the bend 47 extends a pin 48 upon which rests the rods 32, the ends of the hangers being secured to the diagonal sections 17 of the upper chord through the twists 49 on the ends thereof by the bolts 50.

The bend 47 of the hanger 46, besides forming a support for the rods 52, forms an abutment for the spiral springs 51 which surround said rods and tend to retract the shoes from the tread of the wheel after they have been applied thereto. A washer abuts against the bend 47, against which washer the spring bears, its other end bearing against the nut 53 on the rods 32.

It will be seen from the foregoing that the line of pull or draft can remain constant, while the brake mechanism itself can change its relation to the connecting rod 27 through the radiation of the car or truck without causing the same to pull unevenly on the connecting rods, the roller 29 enabling this relative movement of the rod 27 and bar 30 to be performed without undue friction. The spiral springs 51 also tend in a measure to preserve the evenness of the application of the shoes to the wheel.

The brake shoes and upright lever being secured to the axle box frame relieves them from the influence of the movement of the car on the springs. The shoes will not, therefore, drop below, or change their relation to the tread of the wheel, the point of application being nearly constant, if not absolutely so.

I do not limit myself to the method of supporting the rods 52 in the manner shown herein; nor the location of the springs for retracting the shoes from the tread of the wheel; nor the character of the same, (including in this the springs 44, 51) as both may be otherwise constructed and disposed, but I prefer to use them as shown herein.

Having described my invention, I claim—

1. The combination, in a brake mechanism, of fulcrumed and upright brake levers, shoes supported on the levers below their fulcrums, rods leading from the said brake levers on each side of the truck, and secured to the same above their fulcrums both rods being transversely united by a cross bar, and a rod leading from the source of power directly to the cross bar, the arrangement being such that the movement of the shoes to or from the wheel will be in the reverse direction to that of the operating rods, substantially as described.

2. In a brake mechanism, the combination with the shoes and levers on the truck, of the longitudinal rods having a segmental equalizing bar pivotally secured to the ends thereof, and a brake rod leading from the source of power, movably secured to the said bar, substantially as described.

3. The combination with the upright levers fulcrumed to the truck adjacent to the wheels, the shoes secured directly to said levers below their respective fulcra, brake rods leading from said rods above their fulcra, an equalizing bar between the ends of said rods, and a connecting lever leading from the source of power to said bar, and movably connected thereto substantially as described.

4. The combination with the shoes and levers on the truck, of the brake rods leading from said levers, an equalizing bar uniting said rods, a spring about said rods, an abutment for said spring, and a rod leading from the equalizing bar to the source of power, substantially as described.

5. In combination with a brake mechanism, of means for supporting the brake shoe adjacent to the face of the wheel, comprising the block 35 secured to the truck frame, the outwardly extending boss 36, the lever 39 fulcrumed on said boss, and a brake shoe 42 secured to the lower arm of said lever, substantially as described.

6. The combination with the lever 39 fulcrumed upon the truck, rods leading from the upper portion of the said lever to the operating device, a shoe 42 movably secured to the lever below its fulcrum, and a spring 44 fixed at one end to said lever, its free end bearing against the shoe below its union with said lever, substantially as described.

7. In a brake mechanism having the rods 32, an equalizing bar 30, connecting rod 27, of the sleeve nuts 45 for adjusting the length of said rods, substantially as described.

8. In a brake mechanism, the combination of the equalizing bar 30, the parallel rods 32 connected with said equalizing bar, the brake shoes supported upon the truck, and a spring adapted to offer a resilient resistance to the movement of said rods, substantially as described.

9. The combination with a brake mechanism having the rods 32, of a support for the same comprising the hanger 47 secured to the upper chord of the truck, substantially as described.

10. In a brake mechanism, the combination with the equalizing bar 30, parallel rods 32, brake shoes supported on the truck frame, the levers 39 connecting the brake shoes with the rods 32, the hanger 47 for supporting the rods 32, and springs 51 on the rods 32 having a suitable abutment for one end and abutting against the hanger 47 at the other, substantially as described.

11. In combination with a car truck having springs extending between the cross bar of the axle box frame and the upper chord or car sill, and a brake mechanism carried by the truck, of a segmental equalizing bar connecting with the brake mechanism and located outside of the end springs, and a connecting rod leading from the source of power and movably connected with said equalizing bar, the location of said equalizing bar being such as to permit of a movement between said bar and connecting rod without the truck frame, substantially as described.

12. The combination with a brake mechanism supported on the truck, of the equalizing bar 30 without the truck, and a rod 27 carrying an anti-friction roller in contact with said bar substantially as described.

Signed at Philadelphia, in the county of Philadelphia and State of Pennsylvania, this 31st day of March, 1893.

JOHN A. BRILL.

Witnesses:
HENRY C. ESLING,
H. J. LYCETT.